United States Patent
Ito et al.

(10) Patent No.: US 9,216,764 B2
(45) Date of Patent: Dec. 22, 2015

(54) VEHICLE STEERABLE BY MOVEMENT OF CENTER OF GRAVITY

(71) Applicant: KUBOTA CORPORATION, Osaka (JP)

(72) Inventors: Hirokazu Ito, Osaka (JP); Kazuo Koike, Hyogo (JP); Yoshitomo Fujimoto, Osaka (JP)

(73) Assignee: KUBOTA CORPORATION, Osaka (JP)

( * ) Notice: Subject to any disclaimer, the term of this patent is extended or adjusted under 35 U.S.C. 154(b) by 6 days.

(21) Appl. No.: 14/026,090

(22) Filed: Sep. 13, 2013

(65) Prior Publication Data

US 2014/0188338 A1    Jul. 3, 2014

(30) Foreign Application Priority Data

Dec. 27, 2012  (JP) ................. 2012-285815

(51) Int. Cl.
| | | |
|---|---|---|
| *B62D 11/04* | (2006.01) | |
| *B62D 1/02* | (2006.01) | |
| *B62D 51/00* | (2006.01) | |
| *B62D 51/02* | (2006.01) | |
| *A01D 34/64* | (2006.01) | |

(52) U.S. Cl.
CPC ............... *B62D 11/04* (2013.01); *A01D 34/64* (2013.01); *B62D 1/02* (2013.01); *B62D 51/001* (2013.01); *B62D 51/02* (2013.01)

(58) Field of Classification Search
CPC ...... B62D 11/04; B62D 51/02; B62D 51/001; B62D 1/02; A01D 34/64
See application file for complete search history.

(56) References Cited

U.S. PATENT DOCUMENTS

| | | | | |
|---|---|---|---|---|
| 4,878,339 | A  * | 11/1989 | Marier et al. ............... | 56/14.7 |
| 7,481,291 | B2 * | 1/2009  | Nishikawa .................. | 180/218 |
| 7,866,429 | B2 * | 1/2011  | Ishii et al. ................... | 180/218 |
| 2012/0290162 | A1 * | 11/2012 | Stevens et al. .............. | 701/22 |

FOREIGN PATENT DOCUMENTS

| | | |
|---|---|---|
| JP | 2004-138547 | 5/2004 |
| JP | 2004-359094 | 12/2004 |

* cited by examiner

*Primary Examiner* — John Q Nguyen
*Assistant Examiner* — Michael Kerrigan
(74) *Attorney, Agent, or Firm* — Greenblum & Bernstein, P.L.C.

(57) ABSTRACT

A vehicle steerable by movement of the center of gravity has an auxiliary wheel. A left drive wheel is driven by a left rotary driver. A right drive wheel is driven by a right rotary driver. A gravity center position calculator calculates a position of the center of gravity of a driver on a steering step board based on a detection signal from a load detection module detecting a load distribution of the driver. A travel controller has a first control mode controlling rotary drive of the left and right rotary drivers to achieve straight forward travel or turning. The travel controller also has a second control mode controlling the rotary drive of the left and right rotary drivers to achieve straight forward travel, turning or straight backward travel based on the position of the center of gravity. A driver input operation device can be used to select either the first or the second control mode.

20 Claims, 9 Drawing Sheets

VEHICLE STEERABLE BY MOVEMENT OF CENTER OF GRAVITY

CROSS-REFERENCE TO RELATED APPLICATIONS

The present application claims priority under 35 U.S.C. §119 of Japanese Application No. 2012-285815, filed on Dec. 27, 2012, which is herein expressly incorporated by reference in its entirety.

BACKGROUND OF THE INVENTION

1. Field of the Invention

The present invention relates to a vehicle steerable by movement of the center of gravity.

2. Description of Related Art

In a conventional method of steering a vehicle, such as an automobile or a motorcycle, a travel direction is controlled manually with a steering wheel or a handle bar and the vehicle speed is controlled by foot with a gas pedal or a brake pedal. Instead of such a conventional method of steering, steering by movement of the center of gravity is proposed, in which a position of the center of gravity on a steering step board on which a driver rides is detected and a vehicle is steered in association with the position of the center of gravity.

Japanese Patent Laid-Open Publication No. 2004-359094 (FIGS. 5 and 6) discloses such a vehicle steerable by movement of the center of gravity. The vehicle has a first drive motor, a second drive motor, a step board, a gravity center movement detector, and a drive controller. The first drive motor rotates and drives a left wheel. The second drive motor rotates and drives a right wheel. The step board is provided above a vehicle base to allow a person to ride thereon. The gravity center movement detector is provided between the vehicle base and the step board and detects movement of the driver's center of gravity. The drive controller drives and controls the first drive motor and the second drive motor based on a detection signal from the gravity center movement detector to enable straight travel and turning. The gravity center movement detector includes four pressure sensors assigned to respective corners of the step board. The drive controller drives and controls the left and right drive motors based on detection signals from the four pressure sensors. For example, when the center of gravity shifts forward from the center of the vehicle due to weight movement of the driver, the vehicle travels forward. When the center of gravity returns to the center of the vehicle, the left and right drive motors stop, and thus the vehicle stops. On the other hand, when the center of gravity shifts backward from the center of the vehicle, the vehicle travels backward.

Japanese Patent Laid-Open Publication No. 2004-138547 (FIGS. 1 and 2) discloses a drive control apparatus that controls a traveling driving source of a travel device based on load distribution of force exerted in association with driver's weight movement as driving operation of the travel device. During the control, an area where the load distribution is detected is divided into a plurality of sub-areas. The traveling driving source is controlled based on the distribution of load data detected in each sub-area. For instance, shifting the weight toward toes of both feet allows forward travel, while shifting the weight toward heels of the feet allows backward travel. Furthermore, shifting the weight toward the right foot allows a right turn, while shifting the weight toward the left foot allows a left turn. To stop, a state is generated where no load data of the feet are detected, specifically, the feet need to be brought down from a foot plate.

In the conventional technologies above, backward shifting of the center of gravity or backward shifting of the load position enables straight backward travel. In a case, however, where a driver rides while standing, the driver may be brought into such a position inadvertently. In order to prevent such inadvertent straight backward travel, the driver thus should have a sense of tension. In addition, the rotation speed of the left and right wheels, and thus the speed of the vehicle, is consequently determined by the position of the center of gravity or the load position of the driver in the conventional arts. Thus, traveling at a constant speed (cruising) is difficult. Accordingly, a vehicle is desired which is steerable by movement of the center of gravity to have less steering load on a driver.

SUMMARY OF THE INVENTION

An advantage of the present invention is to provide a vehicle steerable by movement of the center of gravity, the vehicle including at least one auxiliary wheel; a left drive wheel driven by a left rotary driver; a right drive wheel driven by a right rotary driver; a steering stand including a steering step board and a load detection module detecting a load distribution on the steering step board of a driver standing thereon; a gravity center position calculator calculating a position of the center of gravity of the driver on the steering step board based on a detection signal from the load detection module; a travel controller having a first control mode and a second control mode, the first control mode controlling rotary drive of the left rotary driver and the right rotary driver so as to achieve one of straight forward travel and turning based on the position of the center of gravity, the second control mode controlling the rotary drive of the left rotary driver and the right rotary driver so as to achieve one of straight forward travel, turning, and straight backward travel based on the position of the center of gravity; and a driver input operation device providing the travel controller with a selection command to select one of the first control mode and the second control mode based on a driver's input operation.

According to the configuration above, the travel controller that provides a rotary drive control command to the left rotary driver and the right rotary driver has the first control mode and the second control mode. In the first control mode, straight backward travel is not achieved no matter where the center of gravity of the driver is positioned, while in the second control mode, straight backward travel is achieved depending on the position of the center of gravity. In addition, the first control mode and the second control mode are selected by the driver's input operation. This allows selection of whether the driver is in a steering state to be able to perform straight backward travel by operating the driver input operation device with the driver's intention. Thus, the driver feels safer in steering the vehicle.

A configuration below is presented as a preferred relationship between the first control mode or second control mode and the position of the center of gravity. Specifically, in the first control mode, accelerated travel is performed when the position of the center of gravity is included in an area of the center of gravity corresponding to a forward leaning standing posture of the driver, and constant speed travel is performed when the position of the center of gravity is included in an area of the center of gravity corresponding to a natural standing posture of the driver. In the second control mode, one of decelerated travel and backward travel is performed when the position of the center of gravity is included in an area of the center of gravity corresponding to a backward leaning standing posture of the driver. In this configuration, the area of the center of gravity that achieves constant speed travel (cruising) is defined in the first control mode, and thus constant speed travel is readily maintained. In addition, for decelerated or backward travel, the second control mode can be selected by operation of the driver input operation device with the driver's intention. In the first control mode, a configuration may be employed in which either constant speed travel or decelerated travel until the vehicle stops is performed when the position of the center of gravity is included in the area of the center of gravity corresponding to the backward leaning standing posture of the driver. In any event, backward travel cannot be performed in the first control mode. In the latter configuration, however, the current speed can be reduced and the vehicle can be stopped in the first control mode. Furthermore, in the second control mode, a configuration may be employed in which either accelerated travel or constant speed travel is performed when the position of the center of gravity is included in the area of the center of gravity corresponding to the forward leaning standing posture of the driver or when the position of the center of gravity is included in the area of the center of gravity corresponding to the natural standing posture of the driver. Thus, steerability similar to that in the first control mode is achieved unless the driver takes the backward leaning standing posture. Backward travel cannot be achieved other than in the second control mode in this aspect, thus reducing a possibility of inadvertent backward travel.

In a preferred aspect of the present invention, the rotary drive control command provided by the travel controller to the left rotary driver and the right rotary driver is one of a positive acceleration command, a constant speed command, and a negative acceleration command. In the conventional art, a system is employed in which speed is adjusted based on driver's posture change, such as backward shifting of the center of gravity or backward shifting of the load position. In this preferred aspect, acceleration is adjusted based on driver's posture change. This allows speed control, with set limits, in which the speed is increased by maintaining the forward leaning posture and the speed is maintained at a constant level by restoring the posture, for example.

In a preferred aspect of the present invention, the driver input operation device is a sensor detecting that the driver is gripping a support tool, and during a time when the driver is gripping the support tool, the selection command to select the second control mode is provided to the travel controller. In the second control mode that allows backward travel in which the driver's posture tends to be unstable, the driver preferably is gripping onto some support tool. Thus, this aspect is preferred in which an act of gripping the support tool by the driver and selection of the second control mode by the driver input operation device are integrated. In a specific aspect of such a support tool, the support tool is a grip bar provided to a support base positioned in front of the driver who is standing on the steering step board facing a forward travel direction and the sensor is a contact detection sensor provided on the grip bar. In this specific configuration, gripping the grip bar reduces instability of the posture of the driver standing on the steering step board when backward travel starts. An additional advantage is that backward travel, including a backward turn, is prohibited unless the grip bar is gripped.

As described above, the vehicle steerable by movement of the center of gravity according to the present invention allows easy constant speed travel and backward travel under full awareness of the driver. Thus, the present invention is suitably applied to a ground work vehicle for mowing and the like that requires constant speed travel and backward travel. Such a vehicle has, for example, a vehicle body frame supported over the ground by the left drive wheel and the right drive wheel and a ground work device provided to the vehicle body frame. For ground work, in particular, the vehicle is required to allow the driver to view an area for ground work sufficiently. Thus, the steering stand is preferably connected to a rear end portion of the vehicle body frame so as to extend rearward therefrom.

The load distribution of the driver on the steering step board or the position of the center of gravity of the driver on the steering step board is different depending on whether the steering step board is in a horizontal state or in an inclined state. When the difference cannot be ignored, a relationship is preferably changed between the position of the center of gravity calculated by the gravity center calculator and rotary drive control amounts for the left rotary driver and the right rotary driver based on the position of the center of gravity, depending on inclination of the steering step board or inclination of the vehicle. In a preferred aspect of the present invention, an inclination sensor measuring an inclination angle of a travel road surface is provided and rotary drive control to the left rotary driver and the right rotary driver is changed depending on the inclination angle.

BRIEF DESCRIPTION OF THE DRAWINGS

The present invention is further described in the detailed description which follows, with reference to the noted plurality of drawings by way of non-limiting examples of exemplary embodiments of the present invention, in which like reference numerals represent similar parts throughout the several views of the drawings, and wherein:

FIGS. 2(a) to 2(e) are schematic views illustrating various modifications of a steering stand in a vehicle according to the prevent invention;

DETAILED DESCRIPTION OF PREFERRED EMBODIMENTS

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt made to show structural details of the present invention in more detail than is necessary for the fundamental understanding of the present invention, the description is taken with the drawings making apparent to those skilled in the art how the forms of the present invention may be embodied in practice.

Figure 1:
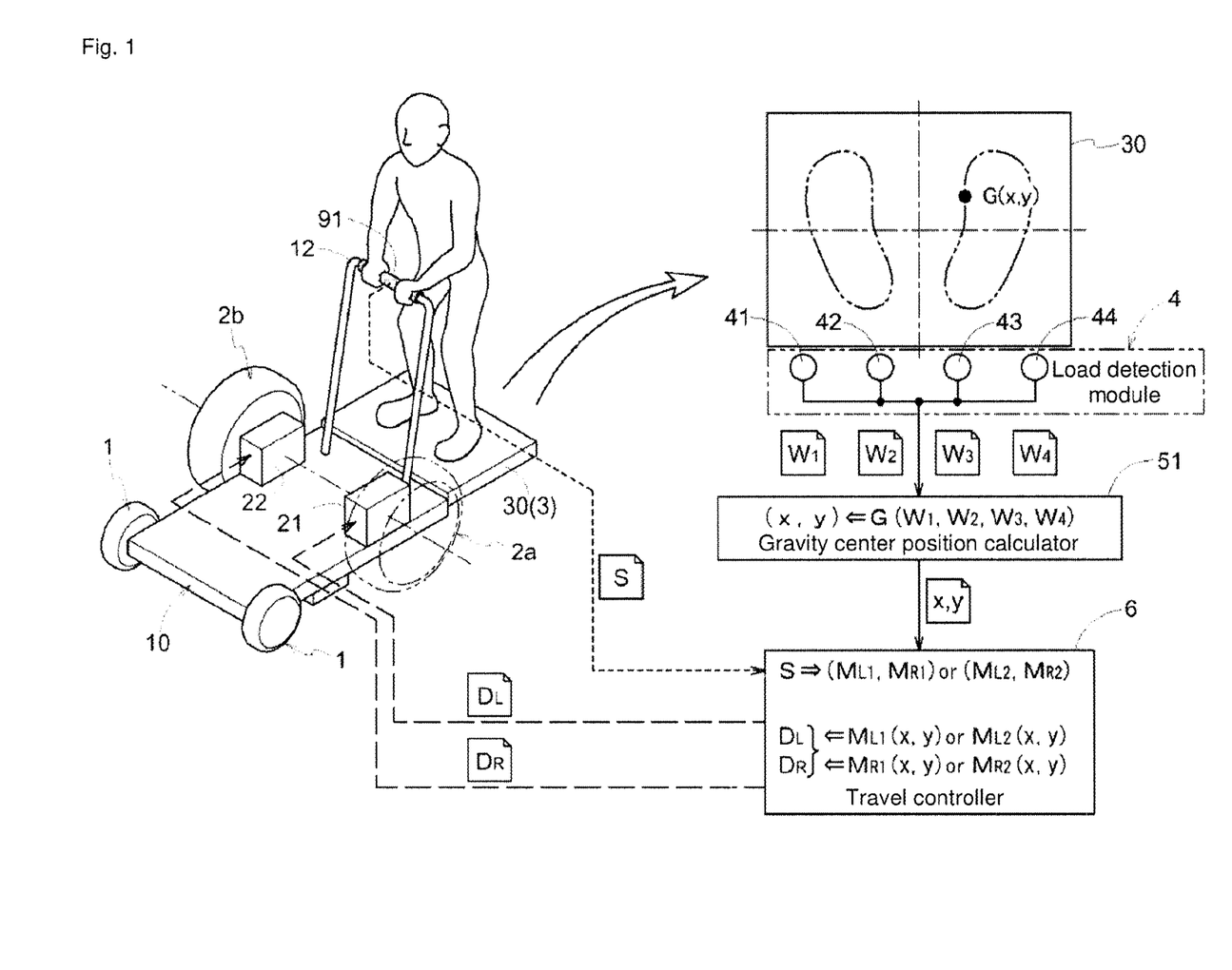
FIG. 1 is a schematic view illustrating a basic steering principle of the present invention.

Prior to description of a specific embodiment of a vehicle steerable by movement of the center of gravity according to the present invention, a steering principle of the vehicle according to the present invention is described with reference to FIG. 1. The vehicle illustrated in FIG. 1 has a left-right pair of front wheels 1 as auxiliary wheels, a left drive wheel 2a, a right drive wheel 2b, and a vehicle body frame 10 supported by the wheels on the ground. A steering stand 3 extends horizontally rearward from a rear portion of the vehicle body frame 10. The left drive wheel 2a and the right drive wheel 2b are independently driven by a left rotary driver 21 and a right rotary driver 22, respectively. The left and right rotary drivers 21 and 22 are each preferably composed of an electric motor, but may be a hydraulic motor, and a drive system of the drivers is not limited. In addition, a grip bar 12 is supported on the vehicle body frame 10 in a position where a driver on a steering step board 30 can grip the grip bar 12 with hands. The grip bar 12 has a grip detection sensor 91 detecting that the driver is gripping the grip bar 12 as a driver input operation device. The steering stand 3 has the steering step board 30 having a horizontal plane and a load detection module 4 detecting a load distribution of the driver standing on the steering step board 30. The load detection module 4, which detects the load distribution in left-right and front-rear directions on the steering step board 30, has three or more load detection sensors (for example, load cells) and outputs detection signals from the respective sensors. In the example of FIG. 1, four detection signals (denoted by $W_1$, $W_2$, $W_3$, and $W_4$ in FIG. 1) are output from four load detection sensors 41, 42, 43, and 44.

A drive control system for the left and right drive wheels 2a and 2b has a gravity center position calculator 51 and a travel controller 6. The gravity center position calculator 51 calculates a position of the center of gravity of the driver on the steering step board 30 based on the detection signals from the load detection module 4. An algorithm for calculating the position of the center of gravity is different depending on the number and placement of the load detection sensors 41, 42, 43, and 44. Basically, the position of the center of gravity is calculated as a function of the detection signals. In FIG. 1, such a function is denoted by G and the position of the center of gravity, which is expressed by an "x" coordinate value and a "y" coordinate value, is calculated as follows:

$(x,y) \leftarrow G(W_1, W_2, W_3, W_4)$

The travel controller 6 generates a rotary drive control command for the left and right rotary drivers 21 and 22 based on the position of the center of gravity calculated by the gravity center position calculator 51. The travel controller 6 has a first control mode and a second control mode. In the first control mode, the travel controller 6 controls rotary drive of the left rotary driver 21 and the right rotary driver 22 so as to achieve one of straight forward travel and turning based on the position of the center of gravity output from the gravity center position calculator 51. In the second control mode, the travel controller 6 controls the rotary drive of the left rotary driver 21 and the right rotary driver 22 so as to achieve one of straight forward travel, turning, and straight backward travel based on the position of the center of gravity. Specifically, an output rotary drive control command is different in the first control mode and the second control mode even with the same position of the center of gravity. The rotary drive control command based on the position of the center of gravity is generated by a control map. In FIG. 1, a control map for the first control mode is denoted by $M_{L1}$ (first control map for the left drive wheel) and $M_{R1}$ (first control map for the right drive wheel); and a control map for the second control mode is denoted by $M_{L2}$ (second control map for the left drive wheel) and $M_{R2}$ (second control map for the right drive wheel). When the first control mode is selected, the travel controller 6 uses the first control map $M_{L1}$ and $M_{R1}$ and the position of the center of gravity (x, y) as parameters, and then derives a rotary drive control command $D_L$ for the left rotary driver 21 and a rotary drive control command $D_R$ for the right rotary driver 22. When the second control mode is selected, the travel controller 6 uses the second control map $M_{L2}$ and $M_{R2}$ and the position of the center of gravity (x, y) as parameters, and then derives a rotary drive control command $D_L$ for the left rotary driver 21 and a rotary drive control command $D_R$ for the right rotary driver 22. The above description is expressed as follows:

First control mode: $D_L \leftarrow M_{L1}(x,y)$, $D_R \leftarrow M_{R1}(x,y)$

Second control mode: $D_L \leftarrow M_{L2}(x,y)$, $D_R \leftarrow M_{R2}(x,y)$

In the description herein, the control map is used to generate the rotary drive control command based on the position of the center of gravity. Alternatively, a logic circuit composed of software or hardware, or both may be used.

Selection of the first control mode or the second control mode is based on a signal (denoted by S in FIG. 1) from the driver input operation device operated by the driver. Thus, only the second control map $M_{L2}$ includes a control factor that commands reverse drive for at least one of the left rotary driver 21 and the right rotary driver 22.

Selection of the first control mode or the second control mode in the example of FIG. 1 is based on a signal from the grip detection sensor 91 that detects that the driver is gripping the grip bar 12. It is preferable that the driver who drives while standing on the steering stand 3 is gripping the grip bar 12 since the body becomes unstable during backward travel. Accordingly, the second control mode is selected only when the driver is gripping the grip bar 12 herein to allow backward travel. The present invention is not limited to direct linking between the act of gripping the grip bar 12 and the second control mode. A control mode selection switch may be provided separately from the grip bar 12. In this case, for backward travel, the driver switches the control mode selection switch to the second control mode, and while gripping the grip bar 12 the driver takes a posture where the center of gravity is assigned to backward travel, generally the posture where the center of gravity is positioned toward heels.

The steering step board 30 included in the steering stand 3 and the load detection module 4 detecting the load distribution of the driver on the steering stand 30 can be combined in various configurations. FIGS. 2(a) to 2(e) show main configurations. In a configuration shown in FIG. 2(a), one square-shaped plate-like body is provided as the steering step board 30 and four load detection sensors detect the load on the steering step board 30. Specifically, the first load detection sensor 41 detects the load in the front left of the steering step board 30; the second load detection sensor 42 detects the load in the front right; the third load detection sensor 43 detects the load in the rear left; and the fourth load detection sensor 44 detects the load in the rear right. For instance, a posture where the center of gravity is positioned toward toes of both feet applies a large load to the first and second load detection sensors 41 and 42; and a posture where the center of gravity is positioned toward toes of the left foot applies a large load disproportionately to the first load detection sensor 41. Thus, the travel controller 6 can recognize the posture of the driver whose center of gravity is positioned toward heels or toes of the left foot or the right foot from variations in load detection values of the first to fourth load detection sensors 41 to 44, eventually the form of load positions.

Figures 2A, 2E:
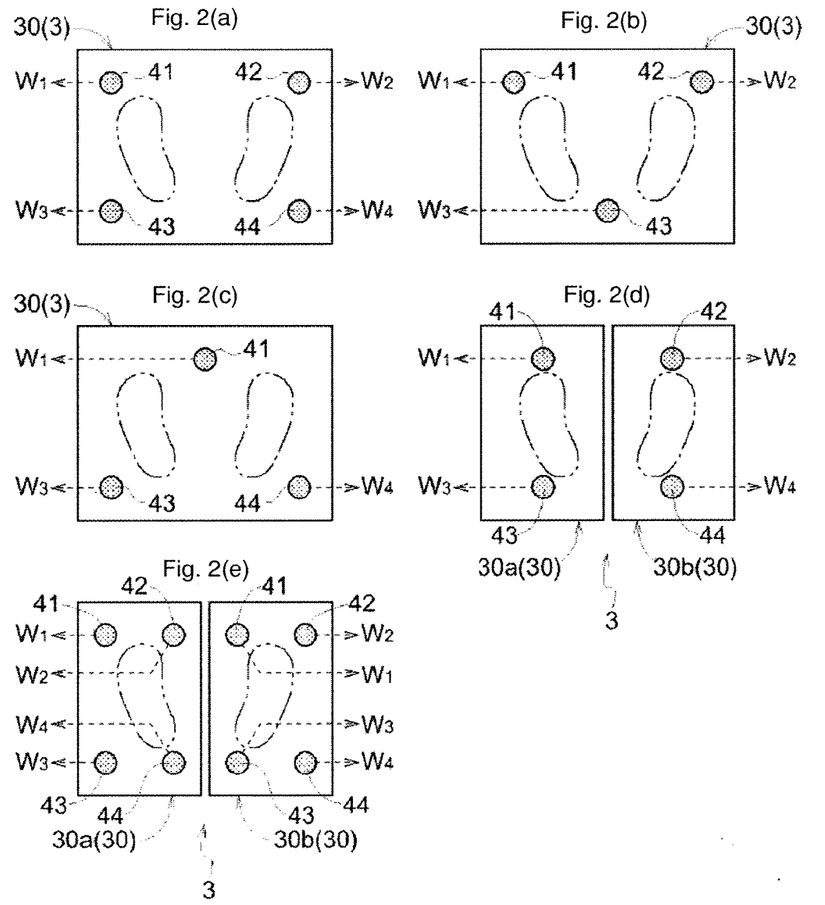

In configurations shown in FIGS. 2(*b*) and 2(*c*), the load on the steering step board 30 is detected by three load detection sensors. Compared to the configuration of FIG. 2(*a*), the fourth load detection sensor 44 is eliminated in the configuration of FIG. 2(*b*), and instead the third load detection sensor 43 is provided in the rear center to detect the load; and the second load detection sensor 42 is eliminated in the configuration of FIG. 2(*c*), and instead the first load detection sensor 41 is provided in the front center to detect the load. The accuracy in three-point measurement above probably declines to some extent compared to four-point measurement of FIG. 2(*a*). However, the driver's posture where the center of gravity is located can be detected in the front-rear and left-right directions.

In configurations shown in FIGS. 2(*d*) and 2(*e*), two rectangular or square-shaped plate-like bodies, which are assigned to the left and right feet, respectively, are provided as the steering step board 30. Specifically, the position of the center of gravity of the left foot is calculated from a load distribution on a left foot steering step board 30*a*, while the position of the center of gravity of the right foot is separately calculated from a load distribution on a right foot steering step board 30*b*. From the two positions of the center of gravity, the position of the center of gravity of the driver is then calculated. In the configuration of FIG. 2(*d*), the load on the left foot steering step board 30*a* is detected by the first load detection sensor 41 and the third load detection sensor 43, which are provided in the front and rear positions, respectively, of the steering step board 30; while the load on the right foot steering step board 30*b* is detected by the second load detection sensor 42 and the fourth load detection sensor 44, which are provided in the front and rear positions, respectively, of the steering step board 30. To calculate the position of the center of gravity more accurately, the first load detection sensor 41 detecting the load in the front left, the second load detection sensor 42 detecting the load in the front right, the third load detection sensor 43 detecting the load in the rear left, and the fourth load detection sensor 44 detecting the load in the rear right are provided to calculate a load position in each of steering step boards 30*a* and 30*b* in the configuration of FIG. 2(*e*).

Figure 3:
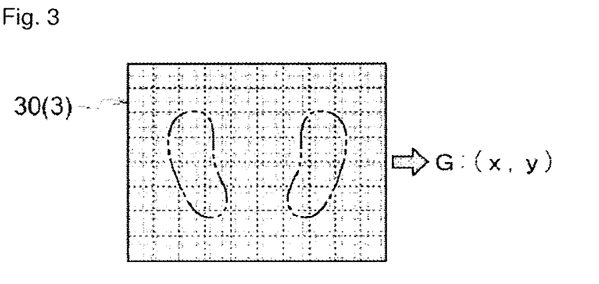
FIG. 3 is a schematic view illustrating an example in which a pressure-sensing sheet is applied as a load detection module.

The steering stand 3 of the present invention is not limited to a configuration where the load distribution of the plate-like steering step board 30 is obtained from the plurality of load detection sensors 41 to 44 that support the steering step board 30. As schematically shown in FIG. 3, for example, a pressure-sensing sheet may be placed on the steering step board 30 such that the steering step board 30 and a load detection module are integrally provided.

Figure 4:
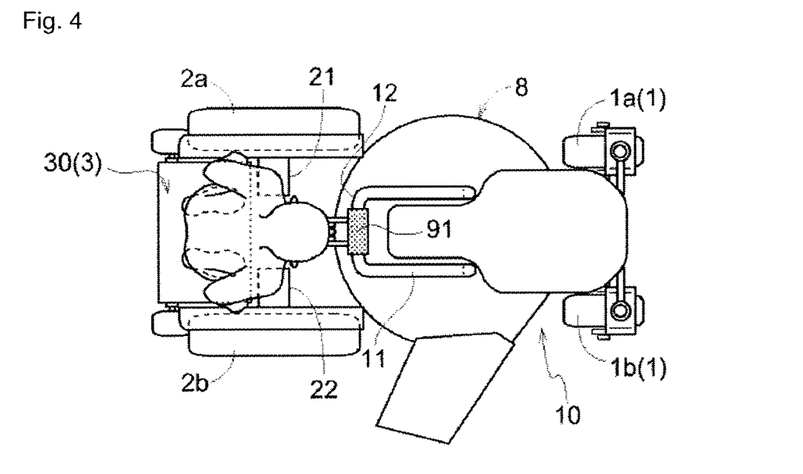
FIG. 4 is a plan view illustrating a specific embodiment of a stand-on mower according to the present invention.
Figure 5:
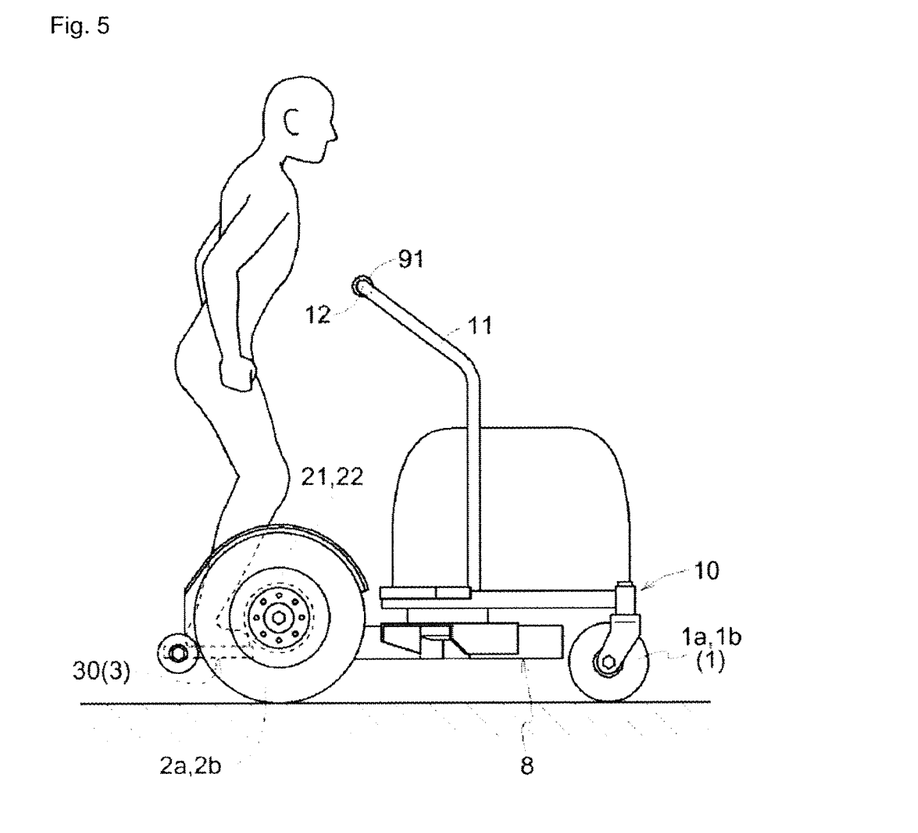
FIG. 5 is a side view of the stand-on mower of FIG. 4.
Figure 6:
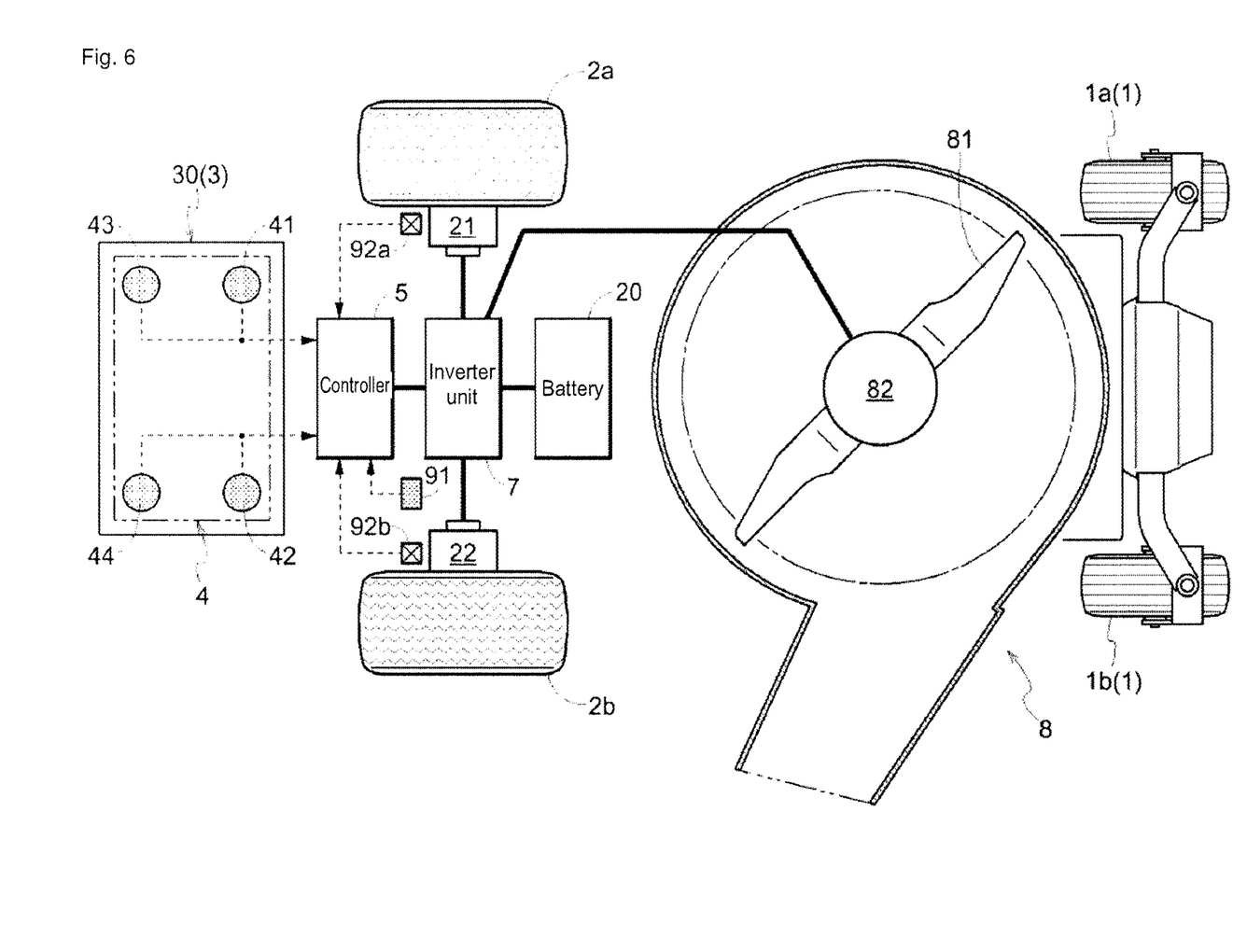
FIG. 6 is a schematic view illustrating rotary power control of the stand-on mower.

With reference to the drawings, a stand-on mower is described below as a specific embodiment of the vehicle steerable by movement of the center of gravity according to the present invention. FIG. 4 is a plan view of the stand-on mower and FIG. 5 is a side view thereof. FIG. 6 is a schematic view illustrating rotary power control of the stand-on mower.

The stand-on mower has a left-right pair of free rotatable caster wheels 1*a* and 1*b* as auxiliary wheels 1, a left rear wheel 2*a* as a left drive wheel, a right rear wheel 2*b* as a right drive wheel, a vehicle body frame 10, and a steering stand 3 coupled to a rear portion of the vehicle body frame 10. A mower unit 8 is suspended from the vehicle body frame 10 so as to be movable up and down by a lift link mechanism (not shown in the drawings), which is provided between the left and right front wheels 1*a* and 1*b* and the left and right rear wheels 2*a* and 2*b*. The stand-on mower, which is an electric driven vehicle, has a left wheel motor 21 and a right wheel motor 22, the left wheel motor 21 serving as a left rotary driver that drives the left rear wheel 2*a*, the right wheel motor 22 serving as a right rotary driver that drives the right rear wheel 2*b*. The mower unit 8, which is also electrically driven, has a blade 81 and a blade motor 82 rotating and driving the blade 81. A battery 20 is placed as a power source in a front portion of the vehicle body frame 10. A support frame 11 stands in a central portion of the vehicle body frame 10 to serve as a support stand that supports a supporting tool for a driver. The support frame 11 is a U-shaped pipe body that includes a left-right pair of legs and a horizontal bridge connecting the legs thereabove. The horizontal bridge acts as a grip bar 12 for an operator standing on the steering stand 3. The grip bar 12 has a grip detection sensor 91 detecting that the driver is gripping the grip bar 12.

As schematically shown in FIG. 6, power is supplied to the left wheel motor 21, the right wheel motor 22, and the blade motor 82 by way of an inverter unit 7 that operates through control of a controller 5, which is also referred to as an ECU. The steering stand 3 has a configuration as shown in FIG. 2(*a*), in which a steering step board 30 and a load detection module 4 are included, the steering step board 30 being composed of a rectangular plate material, the load detection module 4 including four load cells 41 to 44.

The left wheel motor 21 and the right wheel motor 22 each change a rotational direction and rotational speed independently, depending on an amount of power supplied by way of the inverter unit 7. Thus, the rotational direction and rotational speed can be differentiated for the left rear wheel 2*a* and the right rear wheel 2*b*. This enables the stand-on mower to not only travel forward, travel backward, and make a pivot turn due to left-right speed difference, but also to make a super pivot turn where the left and right wheels are rotated in reverse directions to each other.

Figure 7:
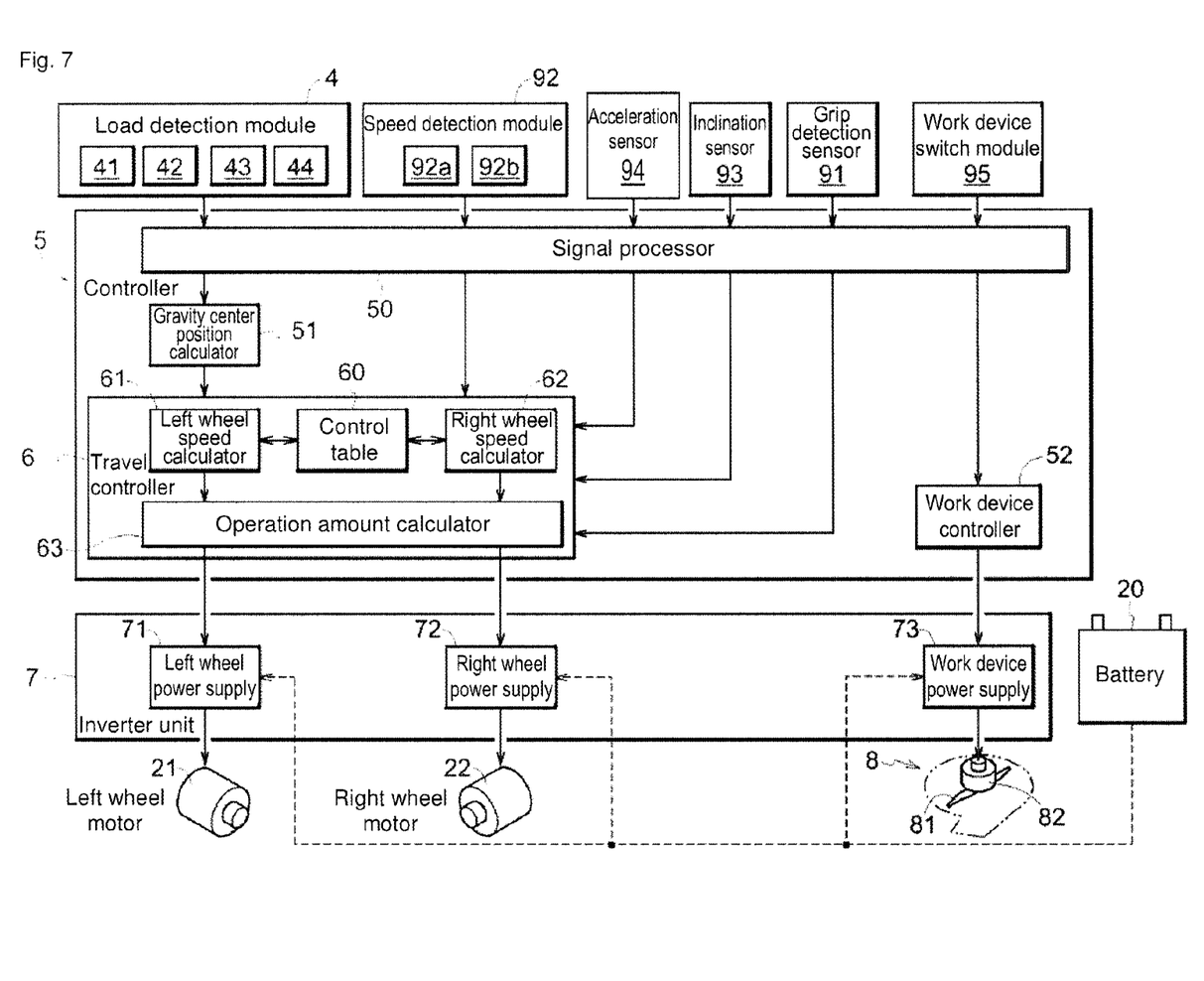
FIG. 7 is a functional block diagram of steering control of the stand-on mower.

Steering control of the stand-on mower is described below with reference to FIG. 7. The controller 5, which is practically composed of a computer, is connected through an input interface to the load detection module 4, the grip detection sensor 91, a speed detection module 92, an inclination sensor 93, an acceleration sensor 94, and a work device switch module 95. The speed detection module 92 includes a left rear wheel rotation detection sensor 92*a* detecting the number of rotations of the left rear wheel 2*a* and a right rear wheel rotation detection sensor 92*b* detecting the number of rotations of the right rear wheel 2*b*. The inclination sensor 93 detects inclination of the vehicle body frame 10. The acceleration sensor 94, which is an optional function, is used to adjust control depending on an acceleration state of the vehicle. The work device switch module 95 is used to command hoisting or lifting of the mower unit 8 or ON/OFF of the blade motor 82 in the present embodiment. Furthermore, the controller 5 is connected to the inverter unit 7 through an output interface. The inverter unit 7, which is connected to the battery 20, has a left wheel power supply 71 supplying power to the left wheel motor 21, a right wheel power supply 72 supplying power to the right wheel motor 22, and a work device power supply 73 supplying power to the blade motor 82.

The controller 5 has functional sections, including a signal processor 50, a gravity center position calculator 51, a work device controller 52, and a travel controller 6. The signal processor 50 performs pre-processing, such as AD conversion or format conversion, of signals input from various sensors or switches. The work device controller 52 generates a control command to control operation of the blade motor 82 based on a signal or an emergency stop signal from the work device switch module 95, and then supplies the command to the work device power supply 73.

Figure 8:
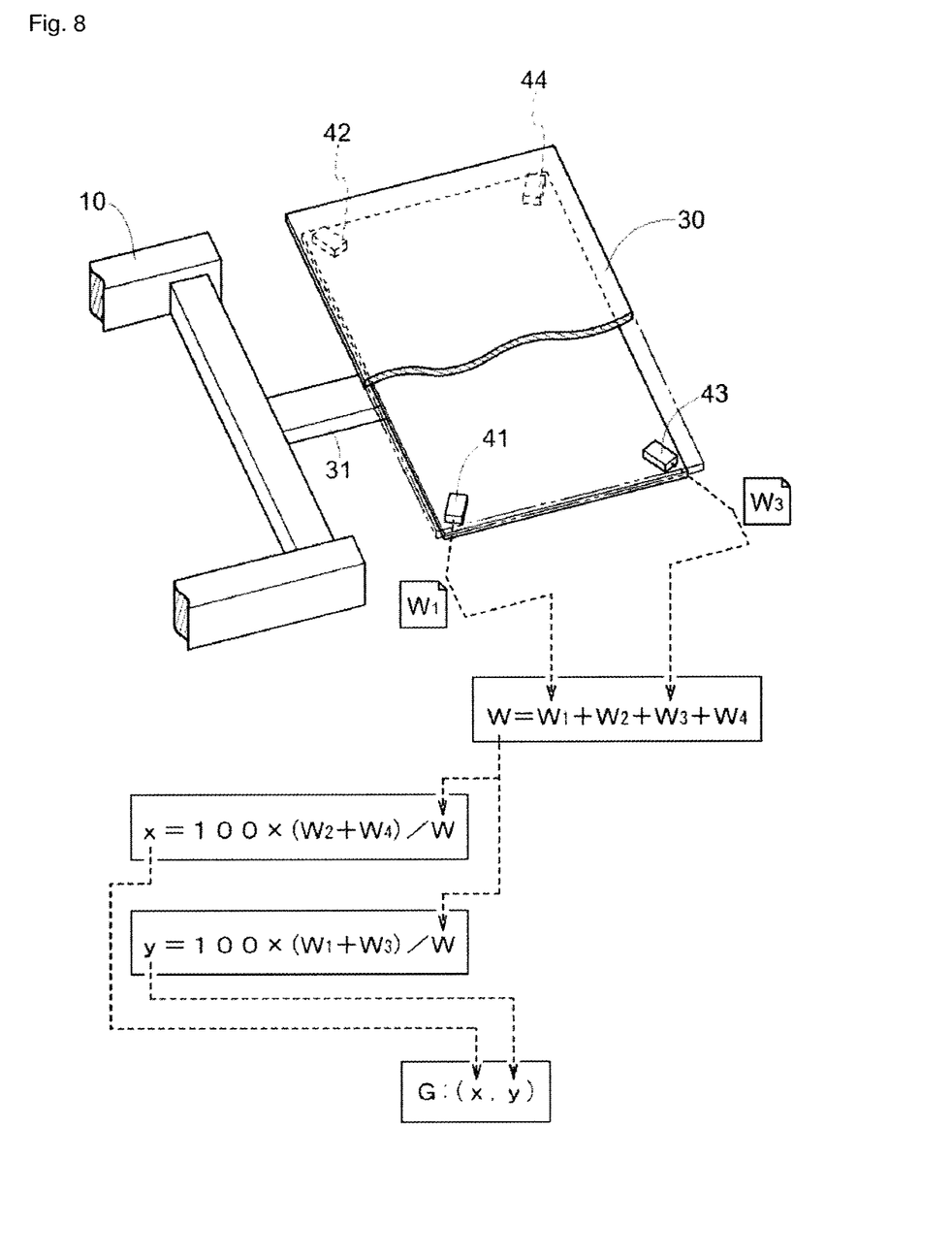
FIG. 8 is a schematic view illustrating computation of a position of the center of gravity using a load cell detection value.

The gravity center position calculator 51 receives load detection signals from the load detection module 4, and then calculates a position of the center of gravity of the driver on the steering step board. The load detection module 4 of the present embodiment includes, as shown in FIG. 8, four load cells 41, 42, 43, and 44 supported by a support frame 31 extending rearward from a rear end of the vehicle body frame 10. Each of the load cells 41, 42, 43, and 44 is a bar-shaped load cell used for a weighing machine. The load cells 41, 42, 43, and 44 are provided diagonally so as to receive the rectangular steering panel 30 having long sides in a vehicle body width direction in four corner portions thereof. In FIG. 8, load detection signals $W_1$, $W_2$, $W_3$, and $W_4$, which indicate the load distribution on the steering panel 30, are output from the four load cells 41, 42, 43, and 44, respectively. The load (weight) W of the driver is expressed as $W=W_1+W_2+W_3+W_4$. Values of the load detection signals $W_1$, $W_2$, $W_3$, and $W_4$ vary depending on the posture of the driver (movement of the center of gravity). Thus, the position of the center of gravity of the driver on the steering panel 30 can be calculated from the values of the load detection signals. When a front-rear direction (travel direction) of the vehicle is defined as a Y axis and a width direction of the vehicle is defined as a Z axis, the position of the center of gravity G defined by (x, y), where "x" is an X coordinate value and "y" is a Y coordinate value, is expressed in percentage as follows:

$x=100\times(W_2+W_4)/W$ $y=100\times(W_1+W_3)/W$

Herein, the position of the center of gravity in the front left most position is represented by (0, 100); the position of the center of gravity in the front right most position is represented by (100, 100); the position of the center of gravity in the rear left most position is represented by (0, 0); and the position of the center of gravity in the rear right most position is represented by (100, 0).

Figure 9A:
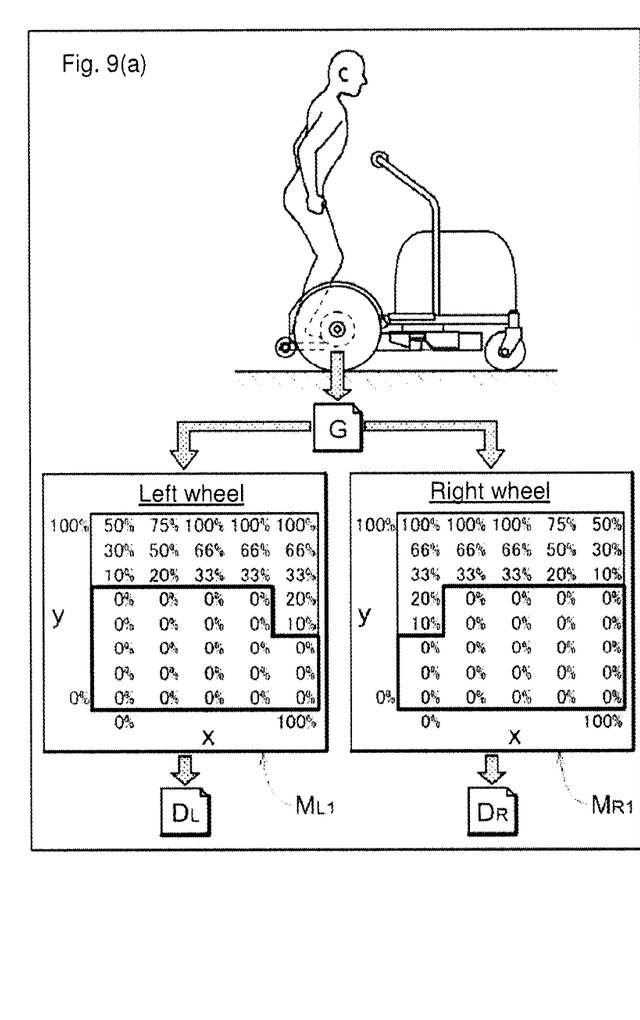
FIGS. 9(a) and 9(b) each illustrate a control map used for rotary drive control.
Figure 9B:
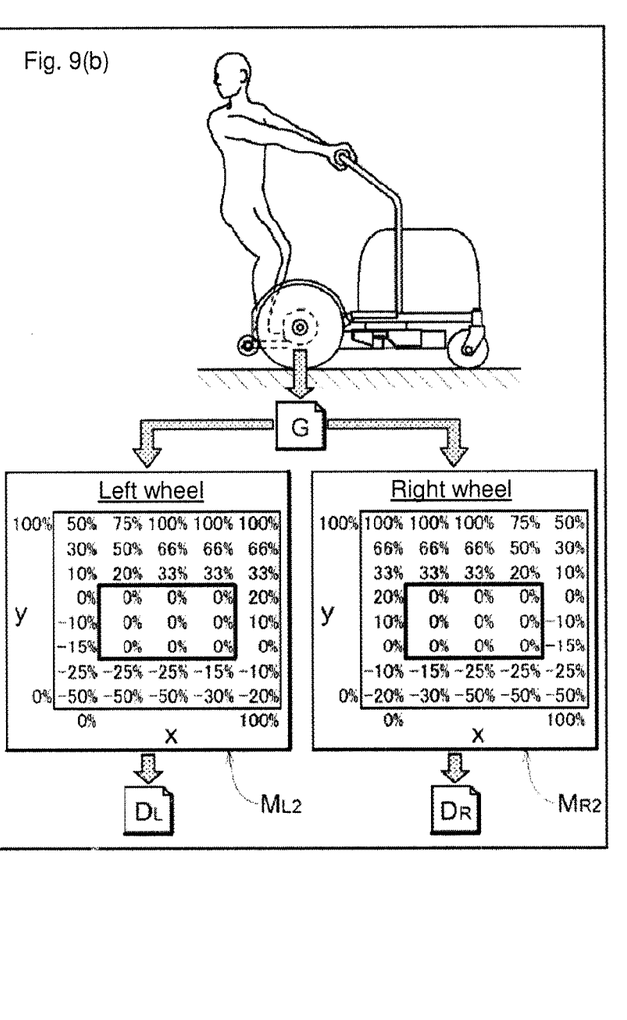

The travel controller 6 includes a control table 60, a left wheel speed calculator 61, a right wheel speed calculator 62, and an operation amount calculator 63. In the present embodiment, acceleration is derived from the position of the center of gravity calculated by the gravity center calculator 51; based on the derived acceleration, an operation amount for the inverter unit 7 is calculated and output; and the number of rotations is controlled for the left wheel motor 21 and the right wheel motor 22. The control table 60 has a control map, as shown in FIGS. 9(a) and 9(b), that derives an acceleration factor to calculate target acceleration from the position of the center of gravity G. The target acceleration is then calculated from the acceleration factor. Multiplying a predetermined numerical value of the acceleration factor produces the target acceleration herein. Alternatively, the target acceleration may be directly derived from the control table 60. In this case, the left wheel speed calculator 61 calculates speed of the left wheel (number of rotations) based on the acceleration factor derived from the control table 60. Based on the calculation result, the operation amount calculator 63 then calculates and outputs the operation amount (rotary drive control command) to the left wheel power supply 71. Similarly, the right wheel speed calculator 62 calculates speed of the right wheel (number of rotations) based on the acceleration factor derived from the control table 60. Based on the calculation result, the operation amount calculator 63 then calculates and outputs the operation amount (rotary drive control command) to the right wheel power supply 72.

As described with reference to FIG. 1, the travel controller 6 has the first control mode which is selected when the driver is not gripping the grip bar 12, and the second control mode which is selected when the driver is gripping the grip bar 12. FIG. 9(a) illustrates the first control map for the left drive wheel $M_{L1}$ to control the left rear wheel 2a and the first control map for the right drive wheel $M_{R1}$ to control the right rear wheel 2b in the first control mode. FIG. 9(b) illustrates the second control map for the left drive wheel $M_{L2}$ to control the left rear wheel 2a and the second control map for the right drive wheel $M_{R2}$ to control the right rear wheel 2b in the second control mode. Numerical values in the maps are expressed in percentage indicating increase and decrease relative to a predetermined acceleration value. Alternatively, numerical values associated with actual acceleration values may be used.

In the first control map for the left drive wheel $M_{L1}$ and the first control map for the right drive wheel $M_{R1}$, greater numerical values (%) are assigned when the center of gravity is positioned further forward, and 0(%) is assigned when the center of gravity is positioned at the center or further backward. This means that when the center of gravity is positioned forward, the vehicle is accelerated and thus the vehicle speed is increased, while when the center of gravity is positioned at the center in the front-rear direction or further backward, the acceleration is 0, specifically, the vehicle travels at a constant speed (cruising). The first control map for the left drive wheel $M_{L1}$ and the first control map for the right drive wheel $M_{R1}$ are different in that the numerical values are set such that when the center of gravity is positioned left forward, a rim speed of the right rear wheel 2b is greater than that of the left rear wheel 2a to achieve a left turn and such that when the center of gravity is positioned right forward, a rim speed of the left rear wheel 2a is greater than that of the right rear wheel 2b to achieve a right turn.

In the second control map for the left drive wheel $M_{L2}$ and the second control map for the right drive wheel $M_{R2}$, greater numerical values (%) are assigned when the center of gravity is positioned further forward, and 0(%) is assigned when the center of gravity is positioned at the center in the front-rear and width directions. This means that when the center of gravity is positioned forward, the vehicle is accelerated, while when the center of gravity is positioned at the center in the front-rear and width directions, the vehicle travels at a constant speed (cruising). In addition, greater negative values (%) are assigned when the center of gravity is positioned further backward. This means that when the center of gravity is positioned backward, the vehicle is decelerated, stopped, and then shifted into reverse (backward travel). Furthermore, when the center of gravity is positioned to the left at the center in the front-rear direction, the left rear wheel 2a is decelerated, stopped, and then shifted into reverse (backward travel) and the right rear wheel 2b is accelerated or travels at a constant speed, and thus the vehicle makes a pivot turn to the left. Similarly, when the center of gravity is positioned to the right at the center in the front-rear direction, the right rear wheel 2b is decelerated, stopped, and then shifted into reverse (backward travel) and the left rear wheel 2a is accelerated or travels at a constant speed, and thus the vehicle makes a pivot turn to the right. Of course, an upper limit value is defined for each of forward speed (normal rotation) and backward speed (reverse rotation). Thus, the left wheel speed calculator 61 and the right wheel speed calculator 62 set speeds (number of rotations) for forward travel and backward travel so as not exceed the upper limit values.

In the present embodiment, the travel controller 6 can recognize a state of travel of the vehicle, such as uphill travel, level-ground travel, and downhill travel, from an inclination detection signal from the inclination sensor 93. The center of gravity of the driver tends to shift backward during uphill travel and tends to shift forward during downhill travel. Thus, based on a detected inclination detection signal, a correction factor is provided to correct an error associated with such tendency. Instead of the control table 60 that assumes level-ground travel, control maps themselves may be switched when uphill travel or downhill travel exceeding a predetermined threshold value is detected. A similar error may occur when the vehicle is inclined in the width direction thereof during transverse travel on a slope. Such an error may be compensated by a correction factor or switching of control maps.

An acceleration detection signal from the acceleration sensor 94 can be used as a feedback signal for speed control based on target acceleration of the left rear wheel 2*a* and the right rear wheel 2*b*. In addition, the acceleration detection signal may be used to determine whether a road surface condition is good or bad (level of travel resistance). Based on the acceleration detection signal, the operation amount calculator 63 may adjust operation amounts (rotary drive control commands) for the left wheel power supply 71 and the right wheel power supply 72.

Figure 10:
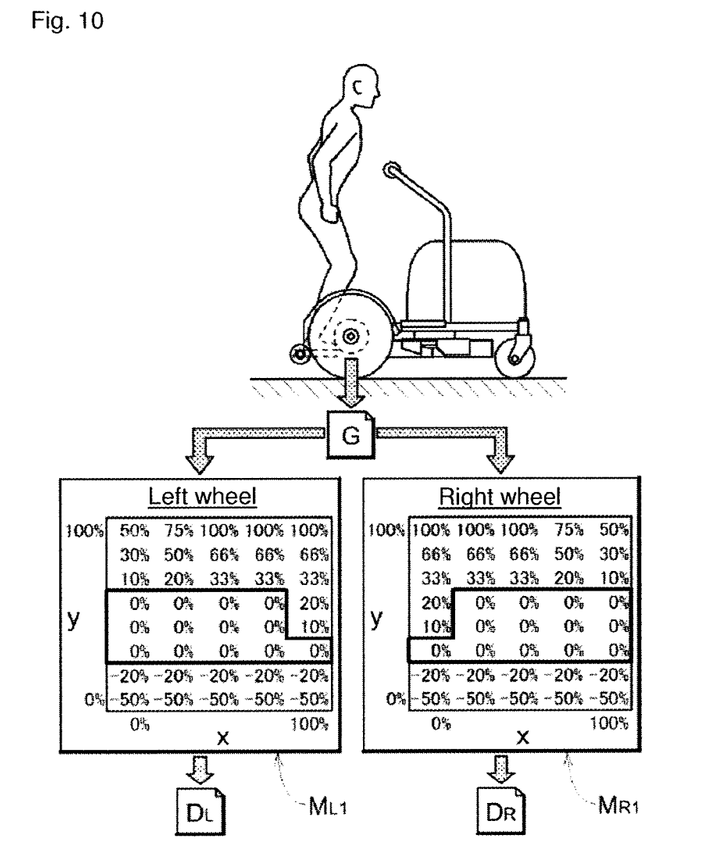
FIG. 10 illustrates a modification of a control map used in a first control mode.

Other Embodiments (1) In the embodiment above, as illustrated in the first control map for the left drive wheel $M_{L1}$ and the first control map for the right drive wheel $M_{R1}$ in FIG. 9(*a*), 0(%) is assigned when the center of gravity is positioned backward. When the driver stands leaning backward, acceleration is 0, thus achieving constant speed travel (cruising). As an alternative, FIG. 10 illustrates a first control map for the left drive wheel $M_{L1}$ and a first control map for the right drive wheel $M_{R1}$, in which negative values (for example, −20% to −50%) are assigned when the center of gravity is positioned backward. When the driver stands leaning backward, negative acceleration, specifically, deceleration is achieved. However, different from the control in the second control mode shown in FIG. 9(*b*), backward travel is not achieved. When acceleration is 0, specifically, the vehicle is stopped, negative acceleration is forced to be set to an acceleration of 0 thereafter. Thus, in this alternative embodiment, when the center of gravity is positioned in an area of the center of gravity corresponding to a backward leaning standing posture of a driver in the first control mode, decelerated travel is achieved until travel stops.

Figure 11:
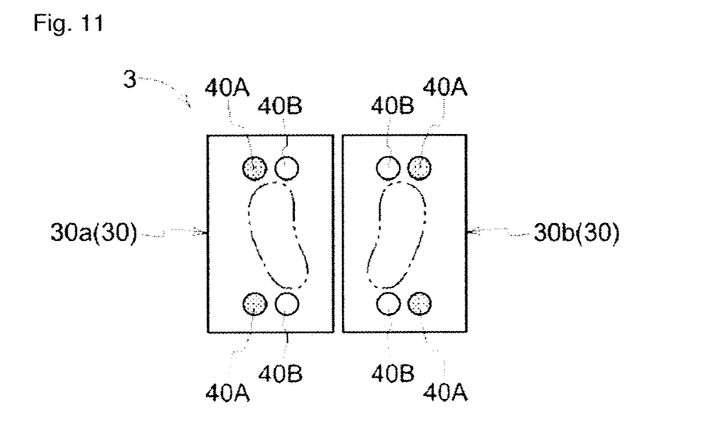
FIG. 11 is a schematic view illustrating an alternative embodiment of a steering stand.
Figure 12:
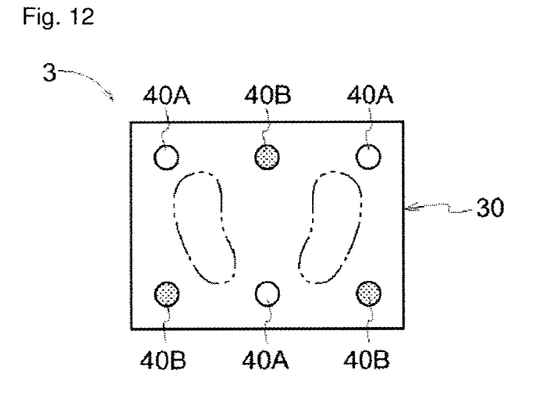
FIG. 12 is a schematic view illustrating another alternative embodiment of a steering stand.

(2) FIGS. 11 and 12 illustrate embodiments of a steering stand 3 having two systems of load detection sensor groups to achieve higher reliability. In FIG. 11, which corresponds to FIG. 2(*d*), two systems of load detection sensors are provided to obtain a load position in each of steering step boards 30*a* and 30*b*. Specifically, the load on the steering step board 30*a* for a left foot is detected by a front-rear pair of load detection sensors 40A of a first system and a front-rear pair of load detection sensors 40B of a second system. Similarly, the load on the steering step board 30*b* for a right foot is detected by a front-rear pair of load detection sensors 40A of a first system and a front-rear pair of load detection sensors 40B of a second system. A load detection module 4 compares the load detection sensors 40A and 40B corresponding to the first system and the second system, respectively. When there is a difference greater than a predetermined value, the load detection module 4 determines that one of the load detection sensors of either of the systems is malfunctioning or is disconnected, and then performs error processing. In the error processing, the sensor having a problem is identified and an error is notified. Even when the error is notified, steering and travelling can continue with the normal system. In FIG. 12, which corresponds to FIG. 2(*b*), three load detection sensors 40A of a first system and three load detection sensors 40B of a second system are provided in reverse positioning in the front-rear direction. The load detection module 4 calculates a first position of the center of gravity based on measurement results of the load detection sensors 40A of the first system and a second position of the center of gravity based on measurement results of the load detection sensors 40B of the second system. When a difference between the first position of the center of gravity and the second position of the center of gravity is below a predetermined value, the load detection module 4 uses an average value or either of the values. When the difference exceeds the predetermined value, the load detection module 4 determines that the load detection module of either of the systems is malfunctioning or is disconnected, and then performs error processing. From detected values by the load detection sensors, the load detection module 4 determines herein as well that one of the load detection sensors of either of the systems is malfunctioning or is disconnected. In the error processing, the sensor having a problem is identified and the error is notified. Even when the error is notified, steering and travelling can continue with the normal system.

Figure 13:
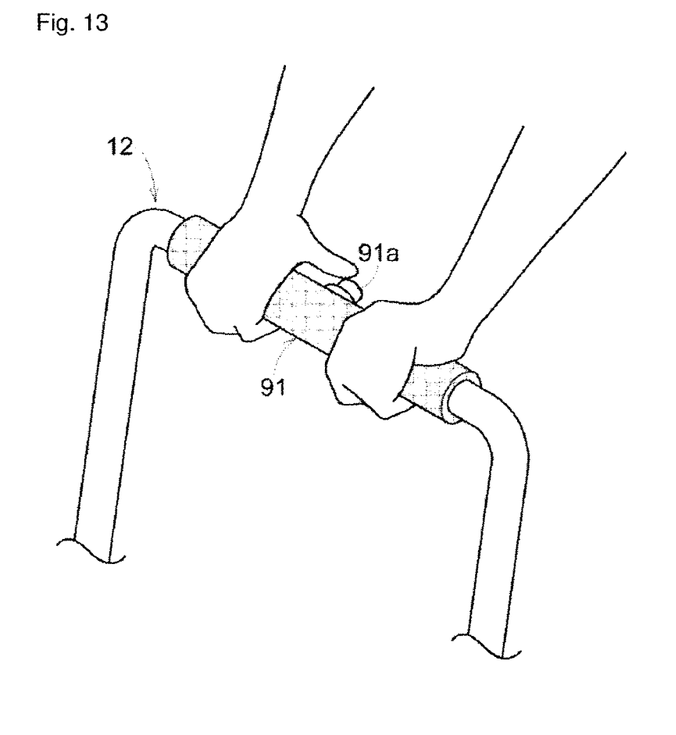
FIG. 13 is a schematic view illustrating an alternative mode of a driver input operation device.

(3) In the embodiment above, the grip detection sensor 91 detecting that the driver is gripping the grip bar 12 is provided as a driver input operation device. When the grip detection sensor 91 detects that the driver is gripping the grip bar 12, the second control mode is selected. FIG. 13 illustrates an alternative embodiment of the driver input operation device. In the alternative embodiment, a button switch 91*a* operated by a hand that is gripping the grip bar 12 is provided to the grip bar 12 as the driver input operation device. The button switch 91*a* is operated to select the second control mode. The grip detection sensor 91 may be used concurrently in the alternative embodiment. Specifically, the second control mode may be selected when the grip detection sensor 91 detects gripping and the button switch 91*a* detects pressing.

(4) At least the left drive wheel 2*a* and the right drive wheel 2*b* are required as drive wheels. However, one auxiliary wheel 1 may suffice.

(5) The left drive wheel 2*a* and the right drive wheel 2*b* are illustrated as of wheel-type in the present specification. In the present invention, however, the left drive wheel 2*a* and the right drive wheel 2*b* are used as a superordinate term that also includes a drive wheel (drive sprocket) in a crawler travel mechanism.

(6) In the embodiment above, the mower unit 8 is employed as a work device. Alternatively, various work devices can be equipped, including a water discharge device or a spray device. A luggage compartment may be provided instead of such a work device.

The present invention is applicable to various vehicles steerable by movement of the center of gravity, including a work vehicle, a transport vehicle, and off-road vehicle.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above-described embodiments, and various variations and modifications may be possible without departing from the scope of the present invention.

What is claimed is:

1. A vehicle steerable by movement of a center of gravity, the vehicle comprising:
    a mower unit;
    at least one auxiliary wheel;
    a left drive wheel driven by a left rotary driver;
    a right drive wheel driven by a right rotary driver;
    a steering stand comprising:
        a steering step surface; and
        a load detection module detecting a load distribution on the steering step surface of a driver arranged on the steering step surface;
    a gravity center position calculator calculating a position of the center of gravity of the driver on the steering step surface based on a detection signal from the load detection module;
    a travel controller having a first control mode and a second control mode;
    the first control mode controlling rotary drive of the left rotary driver and the right rotary driver so as to achieve one of:
        forward travel based on the position of the center of gravity; and
        turning based on the position of the center of gravity;
    the second control mode controlling the rotary drive of the left rotary driver and the right rotary driver so as to achieve one of:
        forward travel based on the position of the center of gravity;
        turning based on the position of the center of gravity; and
        backward travel based on the position of the center of gravity; and
    a driver input operation device providing the travel controller with a selection command to select one of the first control mode and the second control mode based on an input operation of the driver,
    wherein the driver input operation device is usable during mowing and while the mowing unit is operating, and
    wherein the travel controller prevents backward travel unless the driver is gripping a grippable support.

2. The vehicle according to claim 1, wherein the travel controller receives the selection command for as long as the driver input operation device is operated.

3. The vehicle according to claim 1, wherein the driver input operation device is a sensor structured and arranged to detect the gripping of the grippable support by the driver.

4. The vehicle according to claim 3, wherein the travel controller receives the selection command for as long as the sensor detects the gripping.

5. The vehicle according to claim 3, wherein the grippable support is a grip bar.

6. The vehicle according to claim 1, wherein the driver input operation device comprises:
    a support base positioned in front of the driver located on the steering step surface when facing a forward travel direction; and
    a contact detection sensor arranged on the grippable support.

7. The vehicle according to claim 1, wherein the steering stand is arranged in an area of a rear end portion of a vehicle body frame and the vehicle body frame is supported over a ground by the left and right drive wheels.

8. The vehicle according to claim 1, further comprising:
    the vehicle body frame supported over the ground by the left and right drive wheels; and
    the mower unit being coupled to the vehicle body frame.

9. The vehicle according to claim 8, wherein the mower unit is vertically adjustable.

10. The vehicle according to claim 1, wherein
    in the first control mode:
        the vehicle is capable of accelerating in a forward direction when the driver shifts his/her center of gravity by leaning forward; and
        the vehicle is capable of moving at a constant speed in the forward direction when the driver is between forward and back leaning positions or in a natural standing posture;
    in the second control mode:
        the vehicle is capable of either decelerating in the forward direction when the driver shifts his/her center of gravity by leaning backward; or
        the vehicle is capable of traveling in a backward direction when the driver shifts his/her center of gravity by leaning backward.

11. The vehicle according to claim 10, wherein, in the first control mode, the vehicle is capable of travelling at constant speed travel when the driver shifts his/her center of gravity by leaning backward.

12. The vehicle according to claim 10, wherein, in the first control mode, the vehicle is capable of decelerating to a stop when the driver shifts his/her center of gravity by leaning backward.

13. The vehicle according to claim 10, wherein, in the second control mode, the vehicle is capable of either accelerating or travelling at constant speed travel when one of:
    the driver shifts his/her center of gravity by leaning forward; or
    the driver is between forward and back leaning positions or in a natural standing posture.

14. The vehicle according to claim 10, wherein the travel controller is capable of issuing a rotary drive control command to the left and right rotary drivers.

15. The vehicle according to claim 14, wherein the rotary drive control command is one of:
    an acceleration command;
    a constant speed command; and
    a deceleration command.

16. A mowing vehicle steerable by movement of a center of gravity of a vehicle driver, the vehicle comprising: a mower unit;
    a grip bar;
    a first rotary drive motor driving a first wheel;
    a second rotary drive motor driving a second wheel;
    a steering unit comprising:
        a steering surface adapted to support a vehicle driver gripping the grip bar; and
        a load detection module detecting a shifting of a center of gravity of a vehicle driver on the steering surface;
    a travel controller having a first control mode and a second control mode;

the first control mode controlling the first and second rotary drives such that the vehicle can experience at least one of:
forward travel based on one position of the center of gravity of the vehicle driver; and
turning to either the left or the right based on another position of the center of gravity of the vehicle driver;
the second control mode controlling the first and second rotary drives such that the vehicle can experience at least one of:
forward travel based on one position of the center of gravity of the vehicle driver;
turning to either the left or the right based on another position of the center of gravity of the vehicle driver; and
backward travel based on still another position of the center of gravity of the vehicle driver; and
a driver input operation device can activate the first control mode and/or the second control mode,
wherein activation of the second control mode is prevented unless the vehicle driver activates the second control mode while gripping the grip bar.

17. A mowing vehicle steerable by movement of a center of gravity of a standing vehicle driver, the vehicle comprising:
a vehicle driver grip device;
a mowing unit comprising a blade;
a first rotary drive motor driving a first wheel;
a second rotary drive motor driving a second wheel;
a steering unit comprising:
a steering surface adapted to support a standing vehicle driver while gripping the vehicle driver grip device; and
a load detection module detecting a shifting of a center of gravity of a standing vehicle driver on the steering surface;
a travel controller having a first control mode and a second control mode;
the first control mode controlling the first and second rotary drives such that the vehicle can experience each of:
forward travel based on a first position of the center of gravity of the vehicle driver; and
turning to either the left or the right based on a second different position of the center of gravity of the vehicle driver;
the second control mode controlling the first and second rotary drives such that the vehicle can experience each of:
forward travel based on a first position of the center of gravity of the vehicle driver;
turning to either the left or the right based on a second different position of the center of gravity of the vehicle driver; and
backward travel based on a third different position of the center of gravity of the vehicle driver; and
a driver input operation device for activating either the first control mode or the second control mode,
wherein activation of the second control mode is prevented unless gripping of the vehicle driver grip device is detected by a grip detection sensor.

18. The vehicle according to claim 17, wherein the grip detection sensor detecting that the vehicle driver is gripping the vehicle driver grip device is mounted to vehicle driver grip device.

19. The vehicle according to claim 16, further comprising a grip detection sensor detecting that the vehicle driver is gripping the vehicle driver grip device, wherein the second control mode is selected when the vehicle driver is gripping the vehicle driver grip device and the mowing vehicle operates in the second control mode only when the grip detection sensor detects gripping of the vehicle driver grip device.

20. The vehicle according to claim 1, wherein each of:
when the first control mode is selected, backward travel is prevented; and
backward travel is only allowed in the second control mode when a grip detection sensor senses gripping by the driver of the grippable support.

* * * * *